Sept. 1, 1964     J. C. HEWITT, JR     3,147,354
CONTROL DEVICE
Filed Oct. 27, 1961     2 Sheets-Sheet 1

United States Patent Office 3,147,354
Patented Sept. 1, 1964

3,147,354
CONTROL DEVICE
John C. Hewitt, Jr., deceased, late of Long Beach, Calif., by Dorothy V. Hewitt and Patricia A. Morrison, administratrices, both of Long Beach, Calif., assignors to Robertshaw Controls Company, a corporation of Delaware
Filed Oct. 27, 1961, Ser. No. 148,283
7 Claims. (Cl. 200—122)

This invention relates to a control device and more particularly to a thermal responsive control device adapted for actuation in response to a variable heat generating source.

The present invention is particularly adapted, though not limited, for use with a control device for spaced heating appliances and the like wherein the temperature of the space is to be maintained at a preselected value. In such devices, it has been the prior practice to use a heating coil spaced adjacent to a temperature responsive means to anticipate the heat output of the space heating appliance to thereby prevent excessive heating due to the time lag between air circulation within the space to be controlled and the thermostat responsive to the temperature of the space to be controlled.

In order to minimize overheating of the space to be controlled, prior installations have incorporated both fixed and variable resistance heating coils as a means for calibrating the heat anticipation in a specific installation and as a means of compensting for variations in installation requirements and varying voltage loads. The heating coils in prior devices have been of relatively complex design with respect to the windings so as to obtain a reasonable calibration spread for varying current and installation requirements.

The control device herein described is capable of a broad range of heat anticipation utilizing a simple resistance coil winding. Further, the calibration spread of the heat anticipation is secured by a new and novel form of contact wiper which energizes the coil. Variations in calibration spread can readily be obtained by changing the contour and radii of the contact wipers.

It is an object of this invention to utilize a resistance coil winding with a thermal responsive device wherein heat generated by the winding is distributed in a substantially symmetrical pattern relative to the thermal responsive device.

Another object of this invention is to shunt the energization of a resistance coil winding spaced adjacent a thermal responsive device by mechanical means while retaining substantially symmetrical heat source distribution of the winding relative to the thermal responsive device.

A further object of this invention is to insure positive contact pressure between a slide contact wiper adjustment means and the windings of a heat generating coil associated therewith wherein a thermal responsive device is uniformly disposed relative to the heat generator.

Another object of this invention is to symmetrically dispose a heat generating coil relative to a thermal responsive device such that diametrically opposed portions of the coil are energized by a contact wiper to heat the thermal responsive device.

Still another object of this invention is to combine a variable heat generating coil with a thermal responsive device in a simple, compact, and reliable structure permitting economy of manufacture and accuracy in operation.

Other objects and advantages will become apparent from the following detailed description taken in connection with the drawings wherein.

Figure 2:
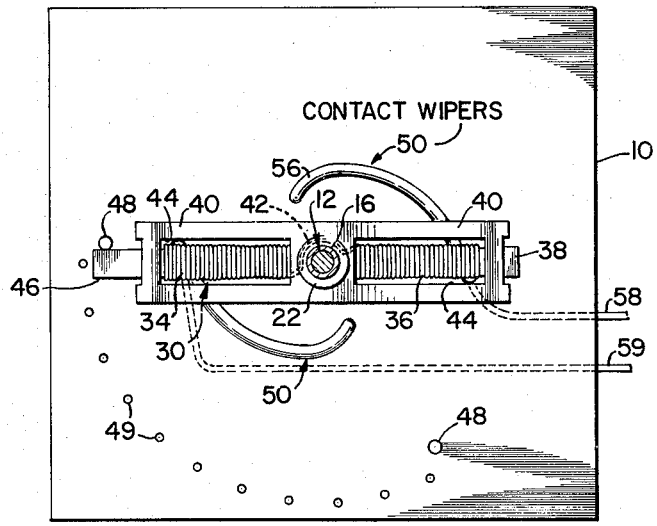
FIG. 2 is a section taken along the line II—II of FIG. 1.
Figure 1:
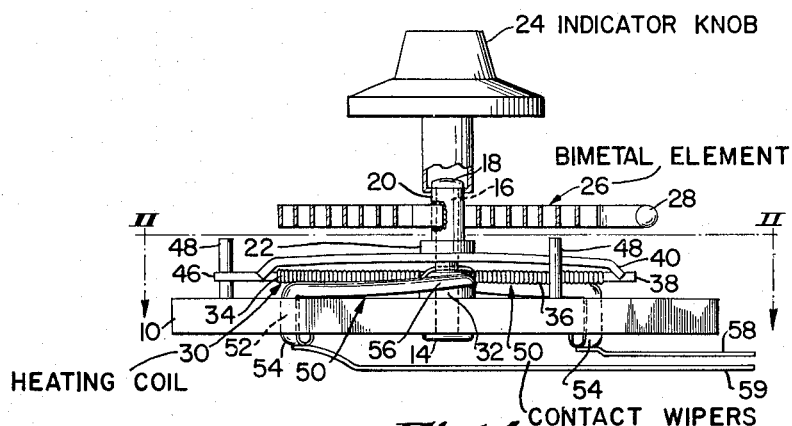
FIG. 1 is a front elevation, partly in section, of the control device of this invention.

Referring more particularly to FIGS. 1 and 2, the control device is mounted on a flat base 10 which is formed from electrical insulating material. Although not shown in the drawings, it is to be understood that a cooperable ventilated housing is adapted to be secured to the base 10 to protect the operating elements described hereinbelow from any accidental damage.

Centrally located in the base 10 is a center post 12 which has one end 14 embedded or otherwise secured to the base 10 so as to prevent relative movement. An upwardly extending portion 16 of the center post 12 has a cooperable end cap member 18 which is adjustable relative to the longitudinal length of the center post 12 for a purpose hereinafter described. A cylindrical sleeve 20 which is freely rotatable on the center post 12 slidably engages the bottom surface of the end cap member 18. The circular bottom surface of the sleeve member 20 abuts against a spacer washer 22 which acts as a bearing surface for the sleeve member 20. An indicator knob 24 is secured to sleeve member 20 in any suitable manner such that rotation of the indicator knob 24 will rotate sleeve member 20 independently of the adjustable cap member 18 and the spacer washer 22.

As shown in FIG. 1, in cross section, a spiral wound bimetallic thermal responsive element 26 is secured to sleeve member 20 at its asymptotic point and extends in a flat plane substantially parallel to base 10. The free end of the bimetallic element 26 has an insulated contact 28 secure thereto, which contact is readily adaptable to cooperate with a stationary contact (see FIGURE 5). Thus, rotation of indicating knob 24 will rotate contact 28 relative to such stationary contact.

Adjacent the base 10, a spacer washer 32 is mounted concentric to the center post 12. A helically wound resistance heating coil 30 of insulated wire, which has a substantially equal number of turns wound on the oppositely disposed end portions 34 and 36 of the insulated coil holder 38, is positioned on the center post 12 substantially at its midpoint and is adapted for rotation thereon independently of the sleeve member 20. It is to be noted that the oppositely disposed portions 34 and 36 of the coil 30 are serially connected by means of a conductor 42. An elongated arcuately formed leaf spring 40, which has elongated cutouts 44 located at each end, spans substantially the length of the coil holder 38. The area of each of the cutouts 44 is at least as large and preferably slightly larger than the top plan surface of the oppositely disposed portions 34 and 36 of the coil 30.

It will thus be apparent that coil holder 38 is spaced from the base 10 and is adapted for rotation in a plane substantially parallel to the flat plane of the base. The elongated leaf spring 40, the compression force of which acts on the ends of coil holder 38, is adjusted by the positioning of cap member 18 relative to the center post 12. Leaf spring 40 biases the coil holder 38 into engagement with spacer washer 32. It is to be particularly noted that the end portions of the coil holder 38 will have a positive biasing force acting thereon tending to deflect the ends of the coil holder downwardly.

One end 46 of the elongated coil holder 38 is extended outwardly and can be adapted as a handle for indicating the rotated position of the coil holder 38. Stop posts 48 determine the limits of rotation of the coil holder 38.

Rotational calibration of the coil holder 38 is indicated by suitable calibration markings 49 positioned on the base 10.

As best shown in FIG. 2, a pair of substantially congruent contact wipers 50 are positioned symmetrically relative to the center post 12. As further shown in FIGS. 1 and 2, one end 52 of each of the contact wipers 50 is embedded in or otherwise secured to the base 10 in a manner to prevent relative movement and in a manner such that fixed end portions 54 of the contact wipers 50 extend downwardly from the bottom surface of the base 10. The free end 56 of the contact wipers 50 are formed in a manner as to be displaced upwardly away from the flat surface of the base 10, which upward displacement is accomplished by utilizing the spring action of the conducting material of which the contact wipers 50 are made.

Figure 5:
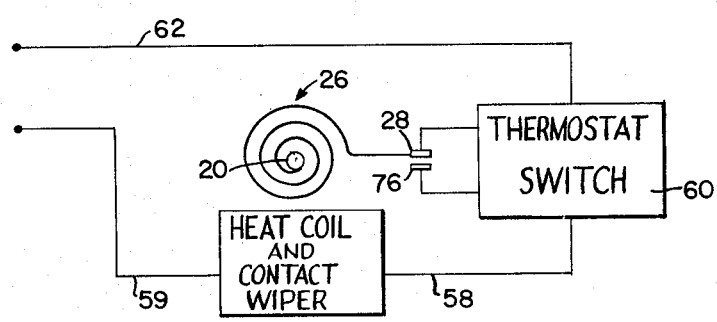
FIG. 5 is a schematic view of an electrical circuit for the control device.

The fixed ends 54 of the contact wipers 50 are connected to leads 58 and 59, which leads are connected in series circuit with a thermostat switch 60 and a power supply conductor 62, respectively, as shown in FIG. 5. The insulation on the bottom surface of the coil 30 is removed so that the wire will be in good contact relationship with the contact wipers 50.

When the coil holder 38 is rotated, the length of coil being energized for heating is confined to the length between the two oppositely disposed contact wipers 50, which length is determined by the points at which the contact wipers 50 engage the coil 30. Further, it will be obvious that the curvature of the contact wipers 50 can be varied to provide a wide degree of rotational calibration as indicated by the calibration markings 49.

Contact pressure between the contact wipers 50 and the coil 30 is maintained at the outer extremities by the compressive force of leaf spring 40 on the coil holder 38. As the coil holder 38 is rotated in a counterclockwise direction, the force exerted by leaf spring 40 will be decreased as the points of contact move inwardly toward the center post 12. However, contact pressure is maintained by contact wipers 50 being bent upwardly at their free ends 56, which upward displacement exerts a biasing force against coil 30.

The curvature of each of the contact wipers 50 can be adjusted symmetrically in plan to obtain any desired rotational angle calibration compensating for heat generation and bimetal placement. Thus, for any particular design, the rotational angle can be made substantially a linear function with respect to the effective heat generated. The heat generated in the opposed portions 34 and 36 heating the coil 30 will be substantially equal to each portion as substantially the same number of turns in each portion will be energized. In this manner, diametric portions of the thermal responsive device 26 will be exposed to substantially equal amounts of heat so as to uniformly act on the exposed heat responsive areas.

The position of the coil holder 38 as shown in FIG. 2 utilizes essentially the entire coil length to obtain maximum heat generation. As the coil holder 38 and coil 30 are rotated counterclockwise, contact wipers 50 successively shunt a decreasing length of resistance coil 30 thereby obtaining less heat generation. When the coil holder 38 is rotated counterclockwise so as to engage stop post 48, substantially zero number windings of coil 30 are energized whereby no heat is generated by the coil.

Figure 4:
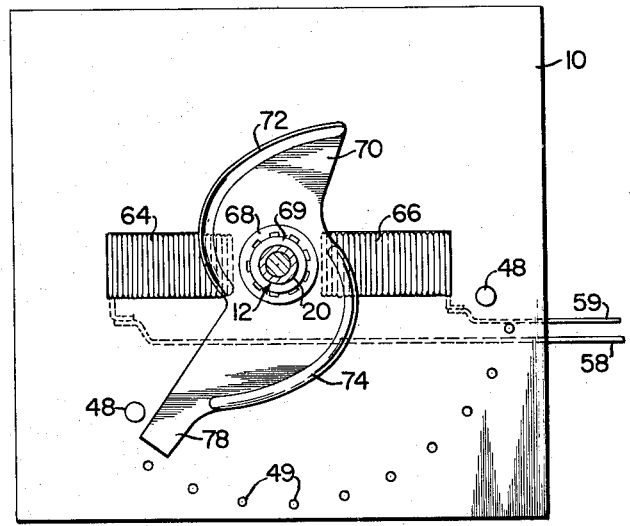
FIG. 4 is a section taken along the line IV—IV of FIG. 3.
Figure 3:
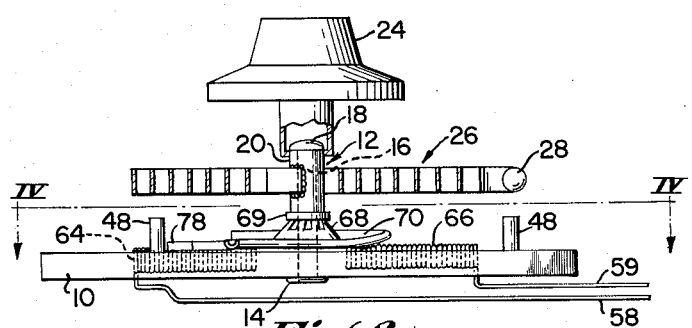
FIG. 3 is a front elevation, partly in section, of another embodiment.

Another embodiment of the control device is shown in FIGS. 3 and 4 wherein parts corresponding to parts hereinbefore described are given like reference numerals. In this embodiment, the heat generating device comprises a pair of separate helically wound coils 64 and 66 of insulated wire which are each fixedly mounted to the base 10. A center post 12, adjusting cap member 18, sleeve 20, and thermal responsive element 26 similarly form a thermal responsive control assembly as was described with relation to FIGS. 1 and 2. A frusto-conical spring washer 68 is concentrically mounted on the center post 12 for engagement with washer 69. Spring washer 68 is adapted to bias an arcuately formed, substantially symmetrical wiper blade 70 into engagement with coils 64 and 66. Wiper blade 70 is adapted to be rotated about center post 12 by a handle 78.

As shown in FIG. 4, the outer peripheral edges of the wiper blade 70 are formed with oppositely disposed crests, which crests define wiper contacts 72 and 74, respectively. The wiper contacts 72 and 74 will engage the oppositely disposed coils 64 and 66.

The outer ends of the two oppositely disposed coils 64 and 66 are connected to leads 58 and 59, respectively, which leads are connected in series with a thermostat switch 60 as shown in FIG. 5. Coils 64 and 66 have their insulation removed from the upper surface of the wire whereby the upper surface of each of the coils is in contact with the contact wiper blade 70.

The wiper blade 70 is formed of a material of good electrical conductivity and of spring quality so as to be resiliently biased into engagement with the oppositely disposed coils 64 and 66, respectively. The wiper blade 70 is formed to have a spring action at the outer peripheral crests so as to maintain good contact pressure between the contact surfaces 72 and 74 of the wiper blade 70 and the resistance coils 64 and 66, respectively. The force of the engagement between the crests of the wiper blade 70 and coils 64 and 66 would therefore be greatest at points on the wiper blade 70 farthest removed from the center post 12 and would decrease as the wiper blade 70 is rotated in a clockwise direction so that the contact points 72 and 74 approach the center post 12. Accordingly, the spring action of the spring washer 68 automatically adjusts the contact pressure as the wiper blade 70 is rotated in a clockwise direction so that the crests of the contact wiper blade 70 approach the center post 12 to thereby automatically adjust the contact pressure over the entire adjustment range.

As best shown in FIG. 4, the resistance coils 62 and 64 are utilized over approximately their entire lengths when the wiper blade 70 is rotated in a clockwise direction to engage stop 48. Current is conducted through the leads 58 and 59 approximately the entire length of the resistance coils 62 and 64 and through the wiper blade 70. Heat thereby generated by the resistance coils 64 and 66 is radiated to the thermal responsive device 26 which is mounted above the coils concentric with the center post 12. The curvature of the wiper contacts 72 and 74 on the wiper blade 70 can be varied to secure any desired proportion of rotational angle versus calibration, which calibration is indicated by the calibration markings 49 mounted on the base 10.

While the component parts of the control device have been particularly described above, as shown in FIG. 5, a particular application is one wherein the operation of the heating unit of a space heater is controlled. As shown in FIG. 5, the thermal responsive device 26 actuates a movable contact 28 into or out of engagement with a stationary contact 76, which engagement energizes a thermostat switch 60. The helically wound resistance heating coil is serially connected by conductor 58 with the thermostat switch 60 so that upon closure of the contacts 28 and 76 of the thermal responsive device, the coil is energized to generate heat. Leads 59 and 62 are connected across a power supply which has a serially connected heating appliance (not shown) connected therein.

Accordingly, the control device can be mounted in a space to be heated by the heating appliance wherein the heating coils are spaced in the vicinity of the bimetal element to anticipate the heating of the heating applicance thereby preventing heating overshoot due to the time lag of air circulation and thermostat response.

Therefore, the heating coil which can be likened to a heat anticipator is effective to produce a small localized source of heat in the vicinity of the thermostat when the heating appliance is "on" for the purpose of shutting off the heating unit a short time before the desired temperature is reached, thereby permitting the latent heat in the heating unit to be dissipated into the space to be heated without exceeding the "off" temperature level. The anticipator is deenergized when the heating unit is "off" so that there is no effect on the temperature at which the thermostat is effective to turn the heating unit "on." The anticipatory heater thus has the effect of reducing the operating differential of the control unit while still providing a relatively uniform cycle of operation. The operation differential should be variable so as to satisfy individual tastes as to comfort while simultaneously limiting "hot" and "cold" spots within the space to be heated. Further, the anticipatory heater can be used to regulate energization of the heating appliance with particular attention devoted to the time for "off" time and "on" time.

It will be understood that although two embodiments of this invention have been shown and described relative to one particular application, the invention can be variously embodied and changes can be made in the construction and arrangement of the parts of the control device without departing from the scope of the invention as defined in the appended claims.

What is claimed is:

1. In a control device for controlling the temperature of a space to be heated, the combination comprising a thermal responsive means for controlling a heating device including diametrically opposed portions, an output element in juxtaposition with said thermal responsive means, and an energizable heat source means positioned adjacent said thermal responsive means to heat diametrically opposed portions of said thermal responsive means, said heat source means being centrally located relative to said thermal responsive means, said heat source means being energized at a predetermined condition of said thermal responsive means whereby diametrically opposed portions of said thermal responsive means are heated substantially at a uniform rate by said heat source means.

2. In a control device for controlling the temperature of a space to be heated, the combination comprising a base, a thermal responsive means having a substantially flat plane pivoted on said base with said flat plane being disposed substantially parallel to said thermal responsive means and located intermediate said base and said thermal responsive means, an output element in juxtaposition with said thermal responsive means, a heat source means of sufficient length to heat the remote diametrically opposed portions of said thermal responsive means, said heat source being centrally located in relation to said thermal responsive means and means for varying the heat energy of said heat source means, said heat source means being energized at a predetermined condition of said thermal responsive means whereby said diametrically opposed portions of said thermal responsive means are heated substantially at a uniform rate by said heat source means.

3. In a control device for controlling the temperature of a space to be heated, the combination comprising a base, a spiral bimetal element pivotally mounted at the asymptotic point thereof to said base and disposed in a plane substantially parallel to said base, a switch positioned adjacent said bimetal element, an elongated heat source means including diametrically opposed portions spaced intermediate said base and said bimetal element for energization, said heat source means being secured to said base intermediate its length and centrally located in relation to said spiral bimetal element, and means for variably energizing said heat source means whereby opposite ends of said bimetal element radiate substantially uniform heat.

4. In a control device for controlling the temperature of a space to be heated, the combination comprising a base, a spiral bimetal thermal responsive means pivotally mounted at the asymptotic point thereof to a rotatable member journaled to said base, said bimetal means disposed in a plane substantially parallel to said base, a switch means mounted in juxtaposition with said bimetal thermal responsive means, an elongated electrically energized heat source means being spaced intermediate said base and said bimetal means, said heat source means being rotatably mounted substantially at the midpoint thereof for energization at a predetermined condition of said bimetal means, an elongated resilient member positioned intermediate said bimetal means and said heat source means, the remote ends of said resilient member engaging said elongated heat source means adjacent the oppositely disposed end portions, and a pair of symmetrical arcuately formed contact wipers being secured at one end to said base and engaging said heat source means to variably energize said heat source means upon rotation of said heat source means whereby diametrically opposed portions of said bimetal means are heated substantially uniformly by said heat source means.

5. A device as claimed in claim 4 wherein said resilient member biases the outer portions of each of said elongated heat source means into engagement with each of said contact wipers, and said contact wipers being formed with their free ends oppositely disposed adjacent to said rotatable member and being displaced from said base whereby said resilient member and said contact wiper cooperate to maintain positive contact pressure upon rotation of said heat source means.

6. In a control device for controlling the temperature of a space to be heated, the combination comprising a base, a rotatable member being journaled to said base, a spiral bimetal thermal responsive means being pivotally mounted at the asymptotic point thereof to said rotatable member, said bimetal means disposed in a plane substantially parallel to said base, a switch means mounted in juxtaposition with said bimetal thermal responsive means, an elongated electrically energized heat source means being secured to said base intermediate said bimetal means and said base, said heat source means for energization at a predetermined condition of said bimetal means, and an arcuately formed contact wiper blade rotatably mounted coaxially with said rotatable member and positioned intermediate said base and said bimetal means for engaging and shunting equal and oppositely disposed portions of said heat source means, said contact wiper blade thereby variably energizing said heat source means whereby diametrically opposed portions of said bimetal means are heated substantially uniformly by said heat source.

7. A device as claimed in claim 6 wherein said contact wiper blade is formed symmetrically to said rotatable member and has arcuate edges of varying radius, said outer ends of each of said wiper blades being tapered towards said heat source means for obtaining increased contact pressure upon rotation of said blade to decrease energization of said heat source means.

References Cited in the file of this patent
UNITED STATES PATENTS

| | | |
|---|---|---|
| 2,572,162 | Koonz | Oct. 23, 1951 |
| 2,589,614 | Ireland | Mar. 18, 1952 |
| 2,643,061 | Johnson | June 23, 1953 |